United States Patent
Belghoul et al.

(10) Patent No.: US 10,716,157 B2
(45) Date of Patent: Jul. 14, 2020

(54) 5G/LTE DUAL CONNECTIVITY

(71) Applicant: Apple Inc., Cupertino, CA (US)

(72) Inventors: Farouk Belghoul, Campbell, CA (US); Christian W. Mucke, Cupertino, CA (US); Lydi Smaini, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/828,576

(22) Filed: Dec. 1, 2017

(65) Prior Publication Data
US 2018/0227960 A1 Aug. 9, 2018

Related U.S. Application Data

(60) Provisional application No. 62/456,961, filed on Feb. 9, 2017.

(51) Int. Cl.
*H04W 72/04* (2009.01)
*H04W 76/16* (2018.01)
(Continued)

(52) U.S. Cl.
CPC .......... *H04W 76/16* (2018.02); *H04L 1/1812* (2013.01); *H04L 1/1854* (2013.01);
(Continued)

(58) Field of Classification Search
CPC . H04W 76/16; H04W 76/15; H04W 72/1215; H04W 72/1268; H04W 72/1273;
(Continued)

(56) References Cited

U.S. PATENT DOCUMENTS

| 9,503,173 | B2 | 11/2016 | McCarthy et al. |
| 2007/0178839 | A1 * | 8/2007 | Rezvani .............. H04B 7/0691 |
| | | | 455/62 |

(Continued)

FOREIGN PATENT DOCUMENTS

| WO | WO-2016095582 A1 * | 6/2016 | ............ H04W 76/16 |
| WO | WO 2016/126238 A1 | 8/2016 | |

(Continued)

OTHER PUBLICATIONS

ZTE: "Discussion on control plane for the DC based LTE/NR tight interworking", 3GPP Draft; R2-163741 Discussion on Control Plane for the DC Based LTE/NR Tight Interworking, 3rd Generation Partnership Project (3GPP), Mobile Competence Centre; 650, Route Des Lucioles; F-06921 So, vol. RAN WG2, No. Nanjing, China; May 23, 2016-May 27, 2016; May 22, 2016; XP051105152, Retrieved from the Internet: URL:http://www.3gpp.org/ftp/Meetings_3GPPSYNC/RAN2/Docs/ [retrieved on May 22, 2016]; four pages.

(Continued)

*Primary Examiner* — Hassan Kizou
*Assistant Examiner* — Mahbubul Bar Chowdhury
(74) *Attorney, Agent, or Firm* — Kowert, Hood, Munyon, Rankin & Goetzel, P.C.

(57) ABSTRACT

Apparatuses, systems, and methods to perform attachment of a wireless device to substantially concurrent connections with a next generation network node and a legacy network node. The wireless device may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request (Continued)

may include an indication that the wireless device is capable of maintaining substantially concurrent connections with the first and second network nodes. Further, the wireless device may be configured to receive an indication that dual connectivity with the first and second network nodes has been established.

20 Claims, 11 Drawing Sheets

(51) Int. Cl.
  *H04W 36/00* (2009.01)
  *H04W 88/06* (2009.01)
  *H04W 72/12* (2009.01)
  *H04L 1/18* (2006.01)
  *H04W 76/15* (2018.01)

(52) U.S. Cl.
  CPC ....... *H04L 1/1861* (2013.01); *H04W 36/0022* (2013.01); *H04W 72/1215* (2013.01); *H04W 72/1268* (2013.01); *H04W 72/1273* (2013.01); *H04W 76/15* (2018.02); *H04W 88/06* (2013.01); *H04W 72/0406* (2013.01)

(58) Field of Classification Search
  CPC ............. H04W 72/0406; H04W 88/06; H04W 36/0022; H04L 1/1812
  See application file for complete search history.

(56) References Cited

U.S. PATENT DOCUMENTS

| | | | |
|---|---|---|---|
| 2015/0312408 A1* | 10/2015 | Shi | H04M 3/4283 455/414.1 |
| 2015/0327107 A1 | 11/2015 | Kim | |
| 2016/0095108 A1* | 3/2016 | Ryoo | H04L 5/0007 370/329 |
| 2017/0257183 A1 | 9/2017 | Vikberg et al. | |
| 2018/0145818 A1* | 5/2018 | Choi | H04L 5/0007 |
| 2018/0199302 A1* | 7/2018 | Yi | H04W 36/0022 |

FOREIGN PATENT DOCUMENTS

| WO | WO 2017/171953 A1 | 10/2017 |
|---|---|---|
| WO | WO-2018029493 A1 * | 2/2018 |

OTHER PUBLICATIONS

Zhang Hongtao et al; "Performance Evaluation for Local Anchor-Based Dual Connectivity in 5G User-Centric Network", IEEE Access, vol. 4, Sep. 7, 2016 (Sep. 7, 2016), pp. 5721-5729, XP011624791, DOI: 10.1109/ACCESS.2016.2606420, [retrieved on Oct. 4, 2016].
International Search Report and Written Opinion, Application No. PCT/US2018/017285, dated May 3, 2018, 14 pages.
Ericsson: "Simultaneous RX/TX in LTE and NR", 3GPP Draft; R2-166829; 3rd Generation Partnership Project (3GPP), Mobile Competence Centre; 650, Route Des Lucioles; F-06921 Sophia-Antipolis Cedex; France, vol. RAN WG2, No. Kaohsiung, Taiwan; Oct. 9, 2016; XP051151281; two pages.
Written Opinion, Application No. PCT/US2018/017285, dated Jan. 7, 2019, nine pages.

* cited by examiner

US 10,716,157 B2

5G/LTE DUAL CONNECTIVITY

PRIORITY DATA

This application claims benefit of priority to U.S. Provisional Application Ser. No. 62/456,961, titled "5G/LTE Dual Connectivity", filed Feb. 9, 2017, by Farouk Belghoul, Christian W. Mucke, and Lydi Smaini, which is hereby incorporated by reference in its entirety as though fully and completely set forth herein.

FIELD

The present application relates to wireless devices, and more particularly to apparatus, systems, and methods for a wireless device to establish and maintain concurrent connections with current radio access technologies and next generation radio access technologies.

DESCRIPTION OF THE RELATED ART

Wireless communication systems are rapidly growing in usage. Further, wireless communication technology has evolved from voice-only communications to also include the transmission of data, such as Internet and multimedia content. Thus, improvements in the field are desired.

SUMMARY

Embodiments relate to apparatuses, systems, and methods to perform attachment of a wireless device to concurrent (or substantially concurrent) connections with a next generation network node (e.g., a fifth generation new radio (5G NR) network node) and a legacy network node (e.g., an LTE network node).

According to some embodiments, a wireless device may include a first radio in communication with a first antenna and a second radio in communication with a second antenna. The first radio may be configured to perform cellular communication according to a first radio access technology (RAT) and the second radio may be configured to perform cellular communication according to a second RAT. The wireless device may also include a switch coupled to the first and second radios and a third antenna coupled to the switch. A first state of the switch may enable communication between the first radio and the third antenna and a second state of the switch may enable communication between the second radio and the third antenna. In addition, the wireless device may include one or more processors coupled to the first and second radios, wherein the one or more processors and the first and second radios may be configured to perform voice and/or data communications according to the first and second RATs, respectively.

According to some embodiments, the wireless device may be configured to transmit, via the first radio while the switch is in the first state, a request to attach to a first network node operating according to the first RAT and transmit, via the first radio while the switch is in the first state, an indication that the wireless device is capable of maintaining substantially concurrent connections with the first network node and a second network node that operates according to the second RAT. The wireless device may also be configured to couple the third antenna to the second radio via the switch and transmit, via the second radio while the switch is in the second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

In some embodiments, the wireless device may be further configured to receive, via the first radio, uplink and downlink grants from the first network node. In addition, the wireless device may be configured to receive, via the second radio, a dynamic uplink resource allocation from the second network node. In some embodiments, the dynamic uplink resource allocation may accommodate (e.g., allow for and/or schedule for) uplink grants received from the first network node. Further, the wireless device may be configured to receive, via the second radio, an uplink hybrid automatic repeat request (HARQ) schedule from the second network node. In some embodiments, the uplink HARQ schedule may accommodate (e.g., allow for and/or schedule for) the uplink grants received from the first network node.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
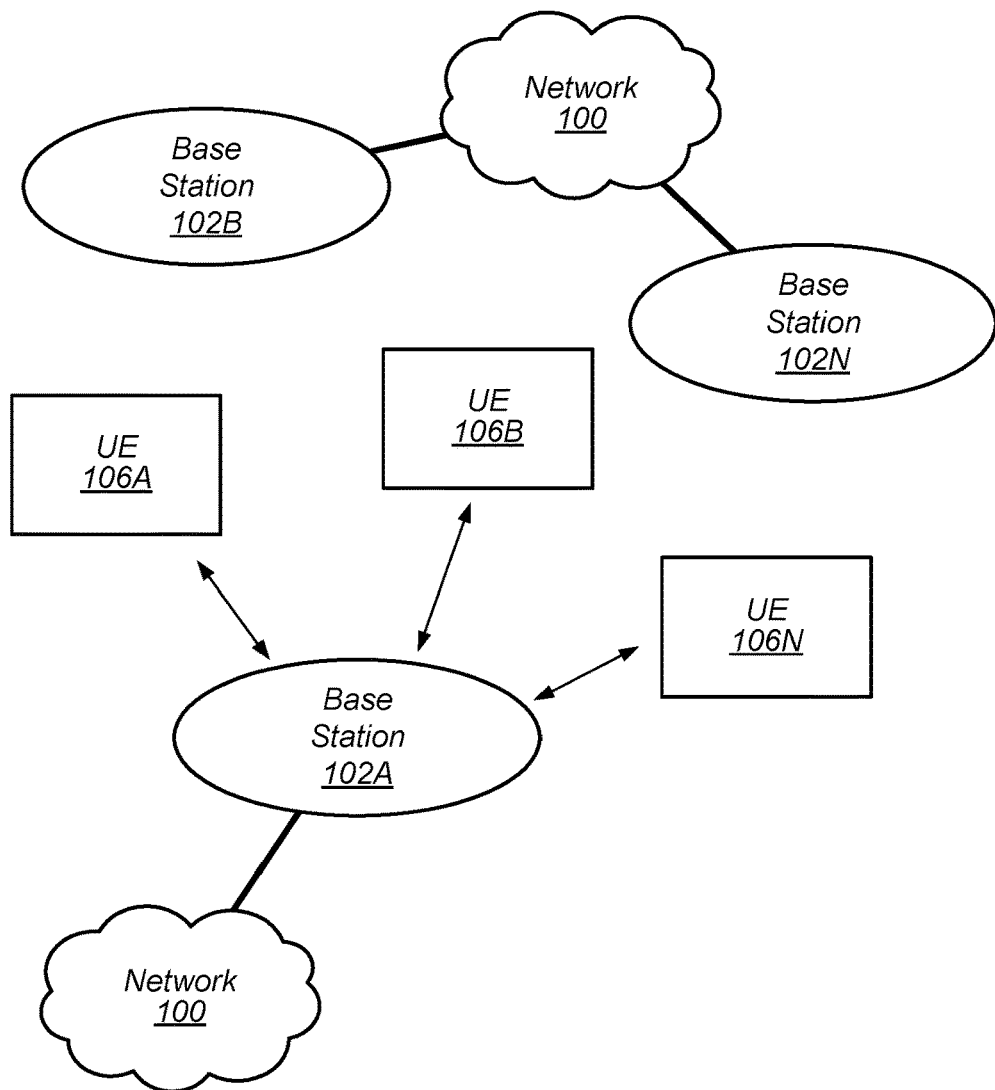
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
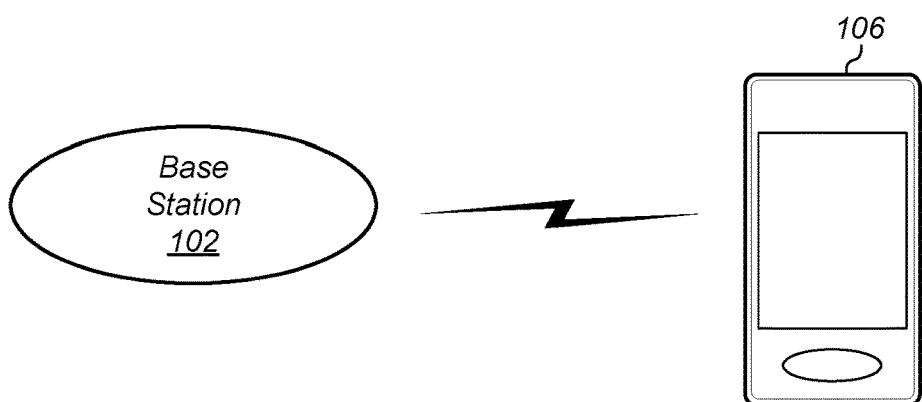
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1× EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G RN, HSPA, 3GPP2 CDMA2000 (e.g., 1×RTT, 1× EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1× EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
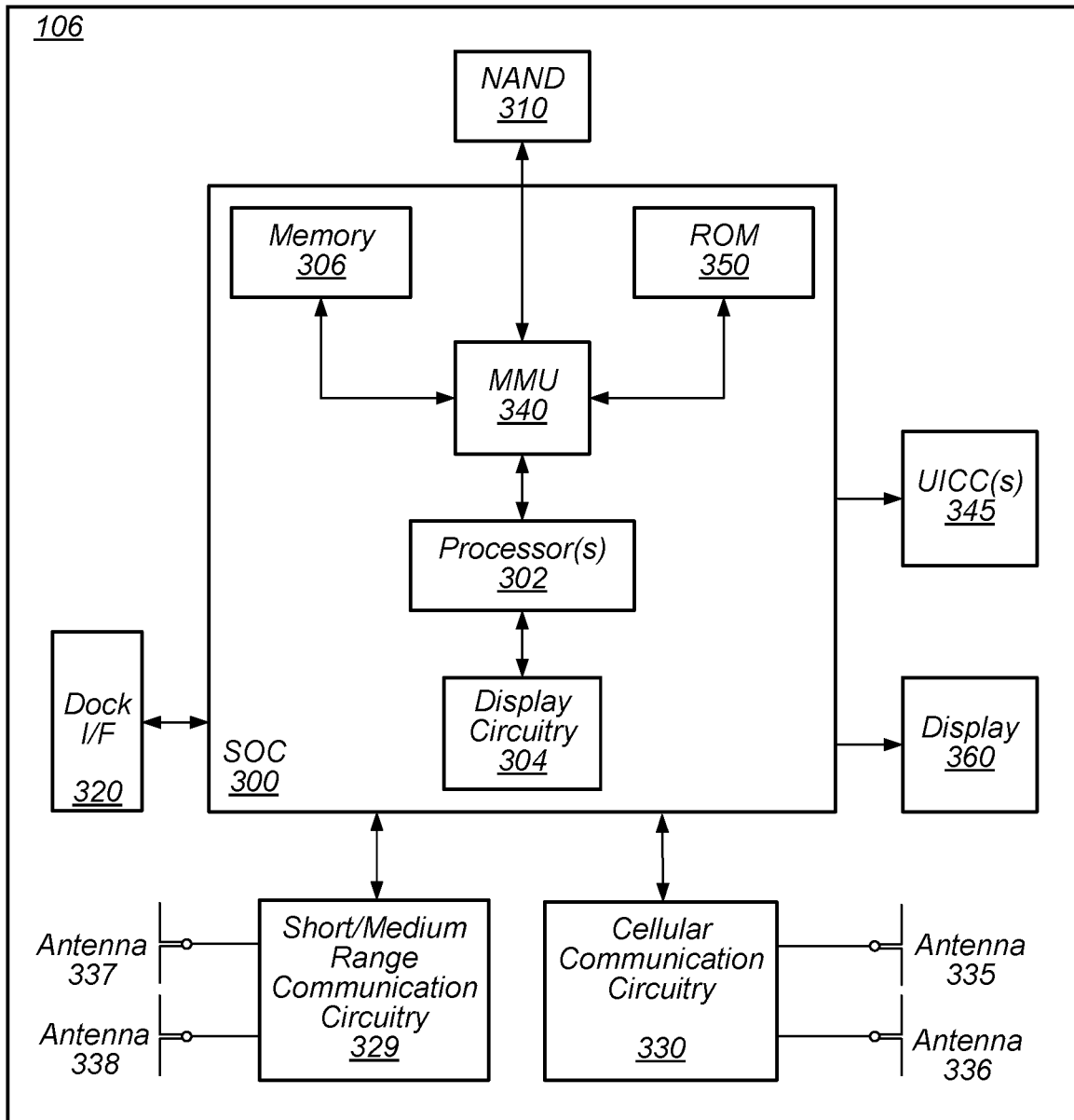
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 370 that include SIM (Subscriber Identity Module) functionality, such as one or more UICC(s) (Universal Integrated Circuit Card(s)) cards 370.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for establishing and utilizing relayed communication channels, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 350, 360, 370 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
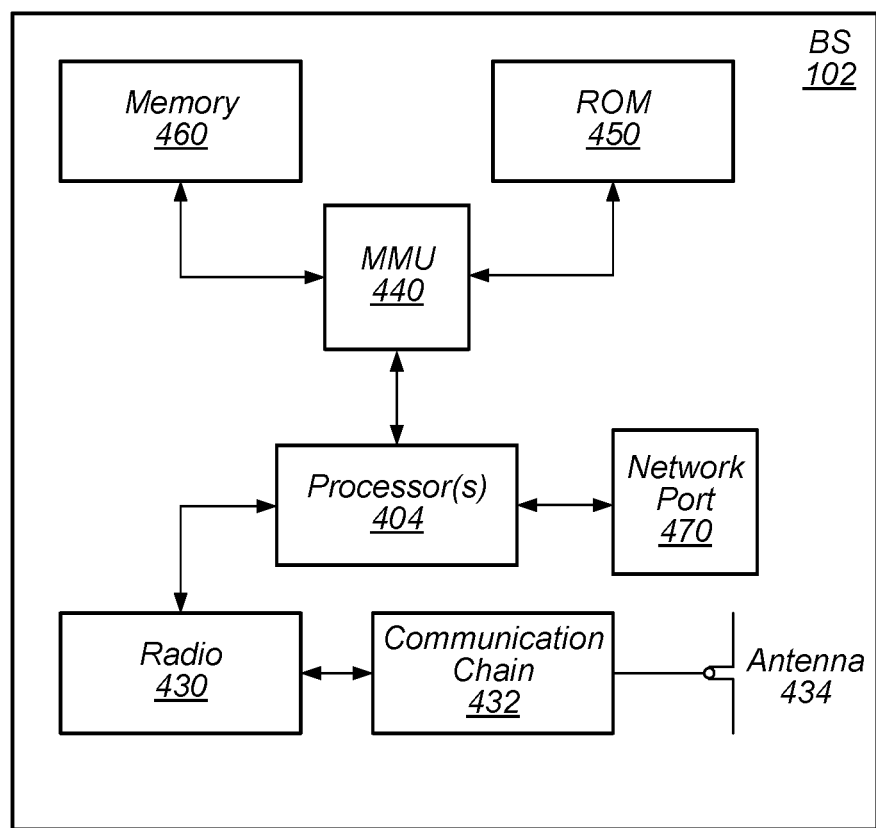
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
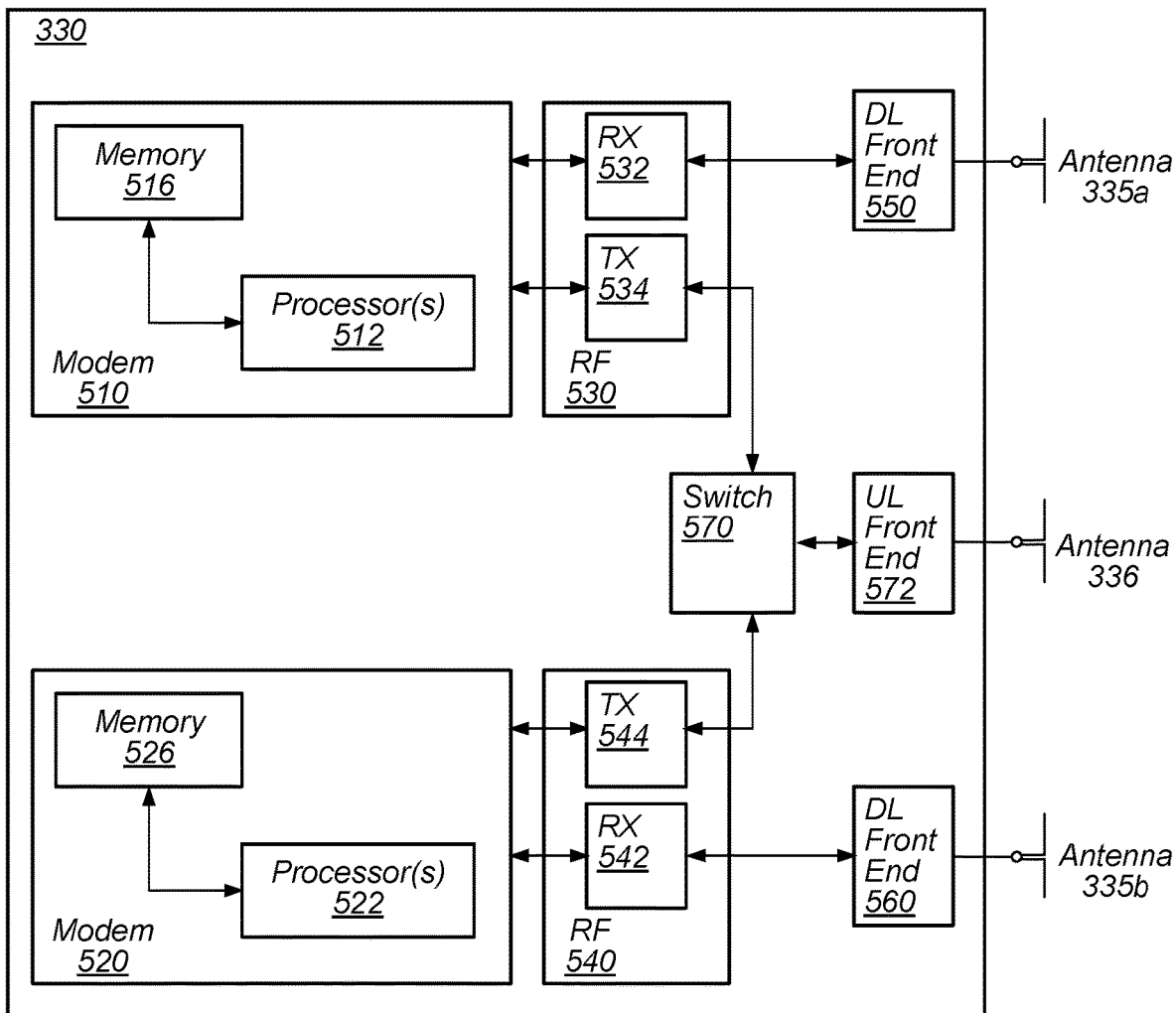
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing the above features for establishing and utilizing relayed communication channels, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for establishing and utilizing relayed communication channels, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G Non-Standalone Operation with LTE

Figure 6A:
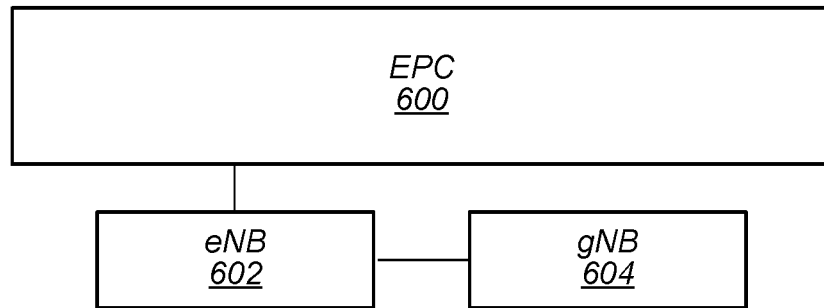
FIG. 6A illustrates an example of connections between an EPC network, an LTE base station (eNB), and a 5G NR base station (gNB).
Figure 6B:
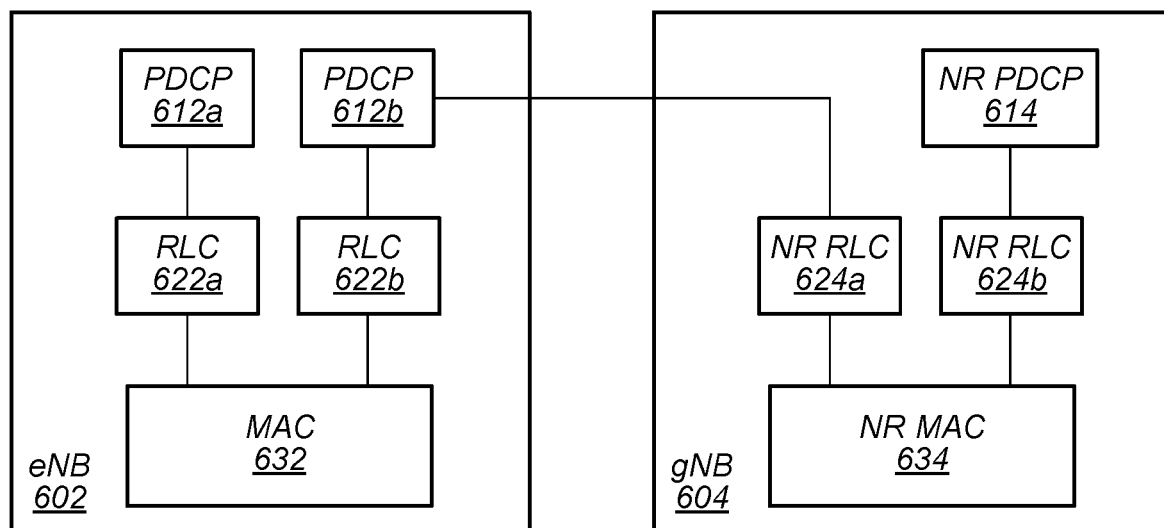
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR) has been specified as part of the initial deployment of 5G NR. Thus, as illustrated in FIG. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 622b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

As noted above, LTE-Advanced Release 12 specifies dual connectivity (e.g., LTE/LTE). However, the dual connectivity specification assumes a UE is able to perform receiving and transmitting in each connection (e.g., MeNB/SeNB) concurrently. In other words, to support dual connectivity as specified in Release 12, a UE is assumed to support concurrent transmission and reception for multiple LTE connections (e.g., a first connection to a master eNB (MeNB) and a second connection to a secondary eNB (SeNB)). Thus, the Release 12 specification assumes a UE supports two downlink (DL) radio frequency (RF) chains and two uplink (UL) RF chains. Further, to support multiple-input, multiple-output (MIMO), it is further assumed that a UE support two distinct (separate) UL MIMO capable RF chains.

However, because of the high cost of RF front ends (RF/FE) and limited space requirements of UEs, it may not be practical to implement two RF/MIMO UL chains. Further, because most UE applications are DL centric, there is a limited need for higher through-put in UL. In practice, two UL RF chains are only needed for hybrid automatic repeat request (HARD) acknowledgments (ACK) and negative acknowledgements (NACK) each connection and to maintain radio resource management (RRM) and/or UL pilots signal transmission. Thus, LTE/LTE dual connectivity has a high implementation cost and thus, has become difficult to implement and deploy.

As a further complication, 5G NR is likely to be deployed using bands less than 6 GHz. Thus, 5G NR and LTE may be operating in overlapped bands and lead to similar difficulties as described above in reference to LTE/LTE dual connectivity. For example, LTE time division duplex (TDD) bands span from 1850 MHz to 2690 MHz, LTE frequency division duplex (FDD) bands span from 700 MHz to 2690 MHz, and LTE licensed-assisted access (LAA) operates at 5 GHz.

Operating bands for 5G-NR are being considered for NR urban macro, NR extreme long distance, and NR urban. For NR urban macro, a range of bands from 24.25 GHz to 52.6 GHz is being considered and around 30 GHz has been chosen as a proxy for this. In addition, range of bands from 1427 MHz to 2690 MHz is also being considered and around 2 GHz has been chosen as a proxy for this range. Further, a range of bands from 3300 MHz to 5090 MHz is also being considered and around 4 GHz has been chosen as a proxy for this range. For NR extreme long distance coverage in low density areas, a range of bands from 450 MHz to 960 MHz is being considered and around 700 MHz has been chosen as a proxy for this range. In addition, a range of bands from 1427 MHz to 2690 MHz is also being considered and around 2 GHz has been chosen as a proxy for this range. Further, a range of bands from 3300 MHz to 5090 MHz is also being considered and around 4 GHz has chosen as a proxy for this range. For, NR urban coverage for massive connection, 700 MHz and 2100 MHz are being considered.

Hence, there will likely be substantial overlap between the operating bands for the various modes of LTE and 5G NR. Further, dual connectivity as currently standardized in Release 12 has a high cost of implementation and complexity.

Embodiments described herein provide systems, methods, and mechanisms for a simplified and lower cost dual connectivity solution.

5G NR/LTE Dual Connectivity

In some embodiments, a UE, such as communication device 106, may use a single UL RF chain for 5G NR and LTE bands, e.g., via cellular communication circuitry 330 as illustrated by FIG. 5 above. In some embodiments, the UE may support two downlink RF chains for concurrent (or substantially concurrent) DL operations in 5G NR and LTE, e.g., via cellular communication circuitry 330 as illustrated by FIG. 5 above. In some embodiments, as further described below, the UE may indicate (e.g., via a transmitted message) to an eNB, e.g., such as eNB 602, its UL RF capabilities (e.g., dual connectivity between 5G NR and LTE) and necessary timing to switch between the two connections (or bands). In some embodiments, a 5G NR physical layer may operate in an N×15 KHz subcarrier spacing, where N is between 1 and 3. In some embodiments, 5G NR may support a dynamic UL/DL HARQ operation timing to accommodate LTE rigid timing of UL HARQ (e.g., N+4). In some embodiments, 5G NR may support dynamic sounding reference signals in order to accommodate UL transmissions in 5G NR. In some embodiments, an eNB, such as eNB 602, and a gNB, such as gNB 604, may communicate through a backhaul connection (or network) every transmission time interval (TTI) to accommodate scheduling of UL/DL resources for both the eNB and the gNB. In some embodiments, the eNB and gNB may be time synchronous. In some embodiments, upon a UE's request for UL and/or DL transmission, the eNB and gNB may communicate the request in order to adapt scheduling between the eNB and gNB. For example, in some embodiments, the eNB may be schedule the UE with a semi-static pattern of UL/DL transmissions and the semi-static pattern may be communicated to the gNB such that the gNB may accommodate the semi-static pattern for UL transmissions.

Figure 7:
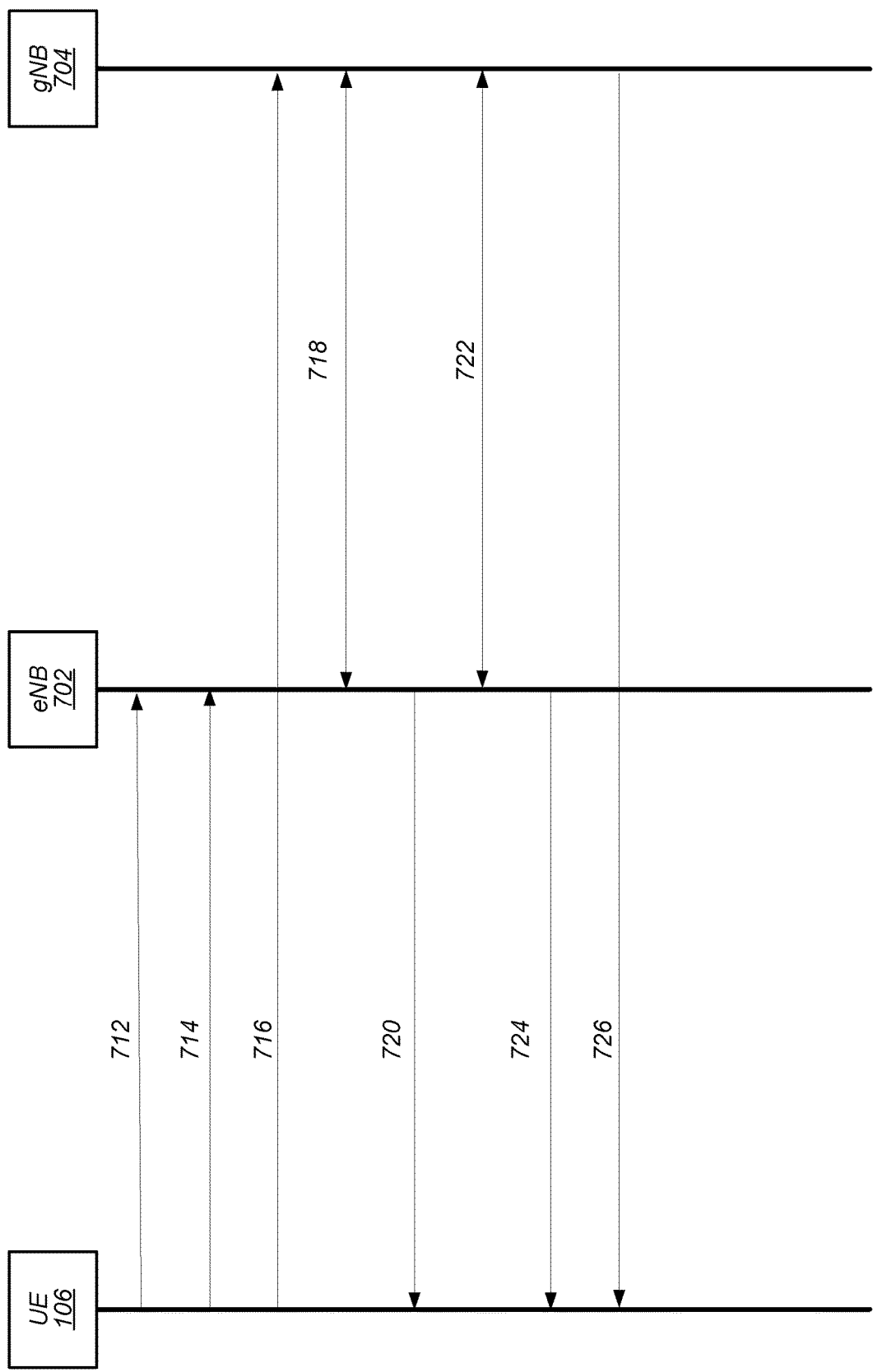
FIG. 7 illustrates a signaling diagram of an example of a technique for a UE to connect to a eNB and gNB substantially concurrently, according to some embodiments.

FIG. 7 illustrates a signaling diagram of an example of a technique for a UE to connect to a eNB and gNB substantially concurrently, according to some embodiments. The signaling shown in FIG. 7 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may flow as follows.

At 712, a UE, such as communications device 106 described above, may transmit signaling to an LTE base station, such as eNB 602 described above, to establish an attachment to an LTE network. In other words, the UE may request a connection with the LTE base station.

At 714, the UE may transmit a message that indicates the UE's capabilities to the LTE base station. The message may include an indication that the UE supports (or is capable of) communication with a 5G NR base station. In some embodiments, the indication may be included as one or more bits in the message. In some embodiments, prior to transmitting the message, the UE may couple (e.g., via a switch) an uplink antenna to a transmit chain dedicated to LTE uplink transmissions, e.g., as described above in reference to FIG. 5.

At 716, the UE may transmit signaling to a 5G NR base station, such as gNB 604 described above, to establish an attachment to a 5G NR network. In other words, the UE may request a connection with the 5G NR base station. In some embodiments, the UE may indicate its capabilities with the request, e.g., whether the UE supports concurrent (or substantially concurrent) connectivity with LTE and 5G NR. In some embodiments, the UE may indicate that the UE supports concurrent (or substantially concurrent) downlink connections with LTE and 5G NR but not concurrent (or substantially concurrent) uplink connections with LTE and 5G NR. In some embodiments, prior to transmitting the signaling, the UE may couple (e.g., via a switch) an uplink antenna to a transmit chain dedicated to 5G NR uplink transmissions, e.g., as described above in reference to FIG. 5.

At 718, the 5G NR and LTE base stations may exchange signaling to negotiate and synchronize uplink communications with the UE when the UE does not support concurrent (or substantially concurrent) uplink connections with LTE and 5G NR. In other words, the 5G NR and LTE base stations may negotiate with one another to establish an uplink schedule for the UE, where the schedule includes uplink communications with the 5G NR base station and LTE base station.

At 720, the UE may receive an indication from the LTE base station that dual connectivity has been established. In other words, the UE may receive a message including one or more bits indicating that a connection with both the LTE base station and the 5G NR base station has been established. In some embodiments, the UE may receive the indication via a downlink antenna coupled to a receive chain dedicated to receiving LTE downlink transmissions, e.g., as described above in reference to FIG. 5.

At 722, the 5G NR and LTE base stations may exchange signaling to exchange information regarding uplink and downlink grants and scheduling of the UE on both the 5G NR network and the LTE network.

At 724, the UE may receive uplink and downlink grants from the LTE base station. In other words, the LTE base station may schedule the UE for uplink and downlink communications on the LTE network. In some embodiments, the UE may receive the indication via a downlink antenna coupled to a receive chain dedicated to receiving LTE downlink transmissions, e.g., as described above in reference to FIG. 5.

At 726, the UE may receive a schedule for uplink and downlink communications with the 5G NR network from the 5G NR base station. The schedule may include dynamic uplink resources and dynamic HARQ to accommodate the uplink grants of the LTE base station. In some embodiments, the UE may receive the indication via a downlink antenna coupled to a receive chain dedicated to receiving 5G NR downlink transmissions, e.g., as described above in reference to FIG. 5.

Figure 8:
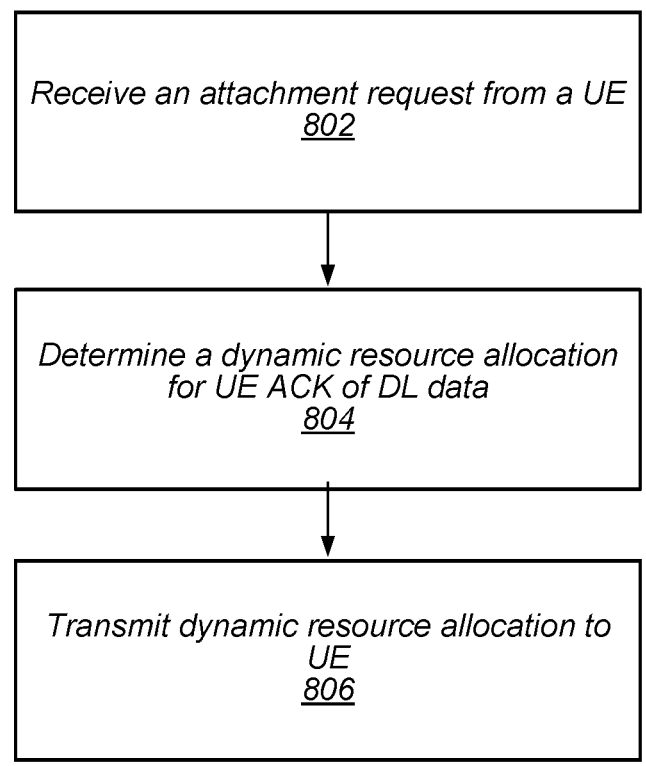
FIG. 8 illustrates a block diagram of an example of a method for dynamically scheduling UE acknowledgment subframes, according to some embodiments.

FIG. 8 illustrates a block diagram of an example of a method for dynamically scheduling UE acknowledgment subframes, according to some embodiments. The method shown in FIG. 8 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 802, a network node, such as gNB 604 described above, may receive, from a user equipment device (UE), such as communication device 106 described above, an attachment request.

At 804, the network node (e.g., a processor of the network node) may determine a dynamic resource allocation for UE acknowledgment of data received from the network node. In other words, the network node may determine a dynamic resource allocation (e.g., of UL subframes or portions of UL subframes) in which the UE is to send acknowledgment information (e.g., acknowledgement of received data (ACK) or negative acknowledgement of data not received (NACK)) associated with specified DL subframes. In some embodiments, the portions of UL subframes may span one or more adjacent subframes. For example, a portion may include a second half of a first subframe, an additional subframe, and a first half a third subframe.

For example, in some embodiments, the dynamic resource allocation may include an indication of one or more downlink subframes to be acknowledged by the UE in a specified uplink subframe. In some embodiments, the dynamic resource allocation may include an indication that the UE bundles acknowledgement information for one or more downlink subframes in the specified uplink subframe. In some embodiments, the dynamic resource allocation may specify asynchronous hybrid automatic repeat request (HARD), e.g., as further described below in reference to FIG. 9. In some embodiments, the dynamic resource allocation may specify asynchronous bundled HARQ, e.g., as further described below in reference to FIG. 9.

Note that in some embodiments, the network node and the UE may operate according to frequency division duplexing (FDD). In addition, in some embodiments, a frame may include twelve subframes and each frame may span 0.0096 seconds and each subframe may span 0.0008 seconds. Further, in some embodiments, the network node and the UE may both operate according to 5G NR.

At 806, the network node may transmit the dynamic resource allocation. In some embodiments, the network node may transmit a downlink control index (DCI) that may specify the dynamic resource allocation, e.g., as Further described below in reference to FIG. 9.

Figure 9:
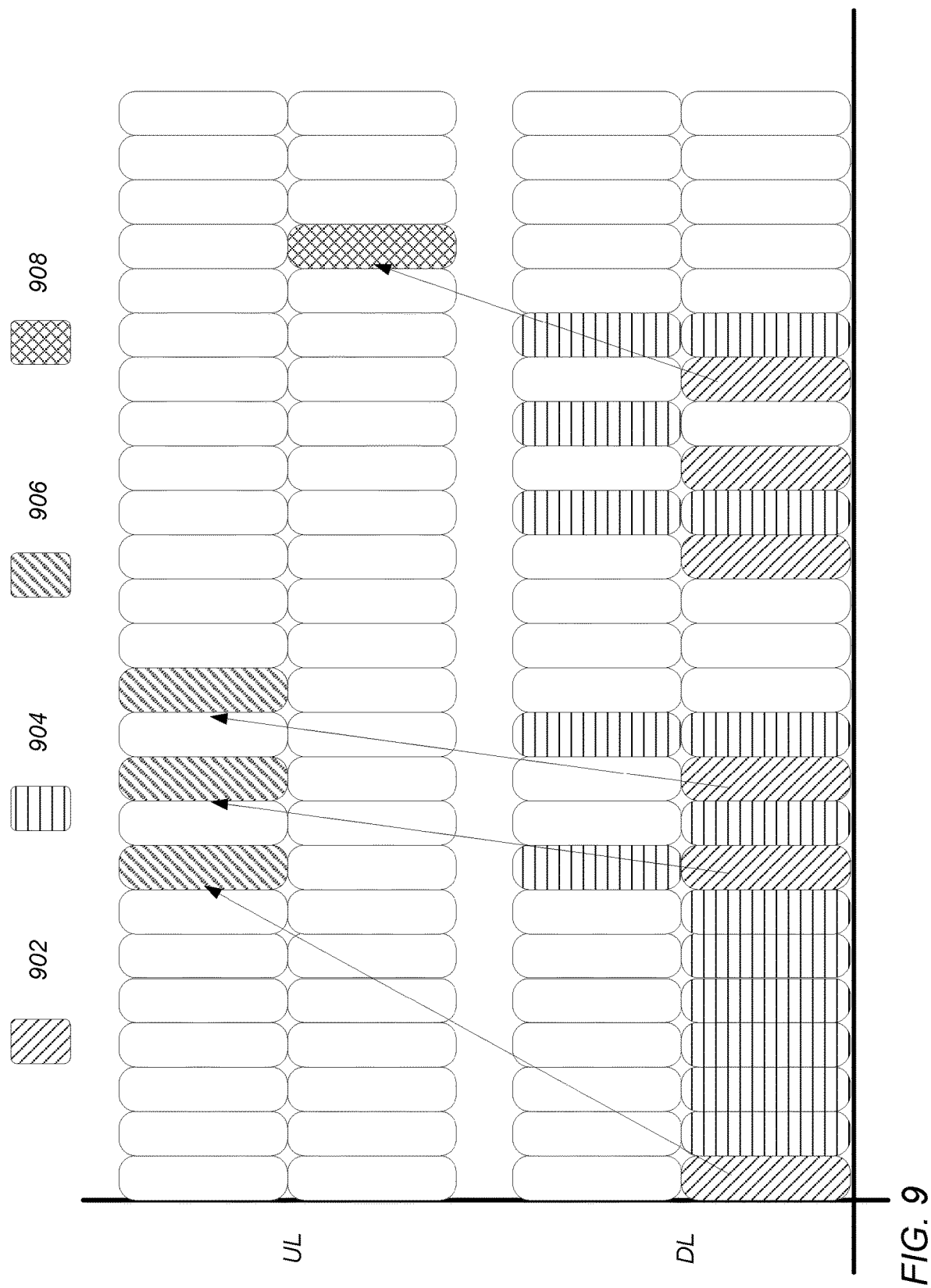
FIG. 9 illustrates an example of a frame schedule for communications according to 5G NR, according to embodiments.

For example, FIG. 9 illustrates an example of a FDD frame schedule for communications according to 5G NR, according to some embodiments. As shown in FIG. 9, a frame schedule may include a flexible HARQ operation, including flexible timing and bundling. In some embodiments, a downlink frame schedule for 5G NR may include one or more downlink control index (DCI) frames 902 and one or more data frames 904. As shown, allocation (and/or scheduling) of the DCI frames may be dynamic. In other words, DCI frames may occur in asynchronous intervals, e.g., as required and/or as necessary. In some embodiments, the DCI frames may indicate scheduling of an uplink subframe (or uplink subframes) for HARQ responses and/or HARQ bundled responses. In addition, uplink HARQ acknowledgements (or negative acknowledgements) may also occur as required and/or as necessary as shown by HARQ responses 906, which may be transmitted based on scheduling information (or scheduling indications) received in DCI frames 902. In addition, some HARQ responses may be bundled, e.g. as shown by HARQ bundle 908. In other words, in some embodiments, asynchronous and/or adaptive HARQ may be supported. In addition, timing between data and HARQ response may be specified by radio resource control signaling and/or via DCI as illustrated. Note that acknowledgement response may be sent in a slot defined by n+k where k>0.

Figure 10:
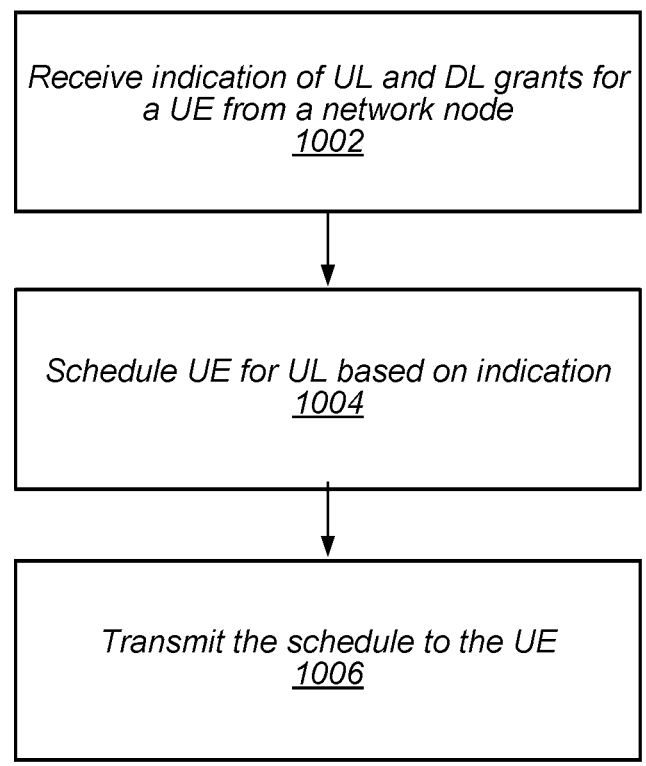
FIG. 10 illustrates a block diagram of an example of a method for dynamically scheduling UE acknowledgment subframes for a UE with substantially concurrent attachments to one or more networks, according to some embodiments.

FIG. 10 illustrates a block diagram of an example of a method for dynamically scheduling UE acknowledgment subframes for a UE with substantially concurrent attachments to one or more networks, according to some embodiments. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, a first network node, such as gNB 604 described above, may receive an indication of uplink and downlink grants scheduled for a UE, such as communication device 106 described above, by a second network node, such as eNB 602 described above, from the second network node. In some embodiments, the UE may have a substantially concurrent attachment to the first and second network nodes. In some embodiments, the first network node may operate according to a first RAT and the second network node may operate according to a second RAT.

In some embodiments, the first and second network nodes and the UE may operate according to frequency division duplexing (FDD). In addition, in some embodiments, a frame of the first RAT may include twelve subframes and each frame may span 0.0096 seconds and each subframe may span 0.0008 seconds. Further, in some embodiments, a frame of the second RAT may include ten subframes and each frame may span 0.01 seconds and each subframe may span 0.001 seconds. In some embodiments, the first RAT may be 5G NR and the second RAT may be LTE.

At 1004, the first network node may schedule one or more portions of UL subframes for UE UL transmissions based (at least in part) on the indication. In other words, the first network node may schedule UE UL transmissions to accommodate (e.g., to not interfere with) UE UL transmission scheduled by the second network node, e.g., as further described below in reference to FIGS. 11 and 12. For example, in some embodiments, the second network node may schedule the UE with a semi-static pattern of UL/DL transmissions and the semi-static pattern may be communicated to the first network node such that the first network node may accommodate the semi-static pattern for UL transmissions to the second network node. In some embodiments, the portions of UL subframes may span one or more adjacent subframes. For example, a portion may include a second half of a first subframe, an additional subframe, and a first half a third subframe.

In some embodiments, the allocation resource assignment may specify asynchronous hybrid automatic repeat request (HARQ) and/or asynchronous bundled HARQ, e.g., as further described below in reference to FIGS. 11 and 12.

At 1006, the first network node may transmit an allocation resource assignment indicating the schedule to the UE. In some embodiments, the allocation resource assignment may be specified via a downlink control index (DCI), e.g., as further described below in reference to FIGS. 11 and 12. In some embodiments, the allocation resource assignment may include an indication of one or more downlink subframes to be acknowledged by the UE in a specified uplink subframe, and/or the allocation resource assignment may include an indication that the UE bundles acknowledgement information for one or more downlink subframes in the specified uplink subframe, e.g., as further described below in reference to FIGS. 11 and 12. In some embodiments, the one or more portions of uplink subframes may correspond to one or more uplink subframes not allocated to the UE by the second network node, e.g., as further described below in reference to FIGS. 11 and 12. In some embodiments, the portions of UL subframes may span one or more adjacent subframes. For example, a portion may include a second half of a first subframe, an additional subframe, and a first half a third subframe.

Figure 11:
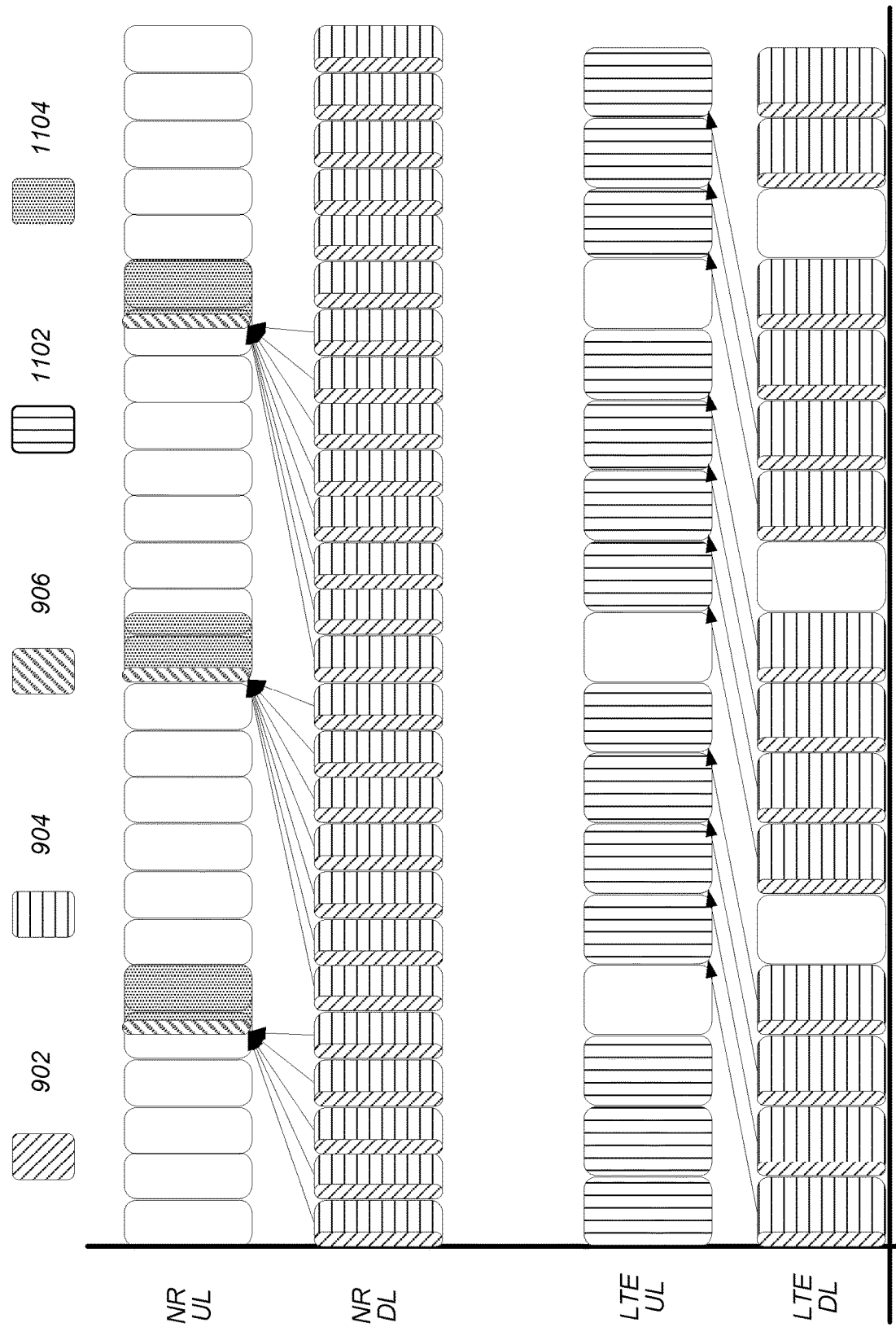
FIG. 11 illustrates an example of frame schedules for substantially concurrent communications according to 5G NR and LTE, according to some embodiments.

For example, FIG. 11 illustrates an example of FDD frame schedules for substantially concurrent communications according to 5G NR and LTE, according to some embodiments. As shown in FIG. 11, an LTE frame schedule may include synchronous HARQ transmissions via the physical uplink control channel (PUCCH) and/or the physical uplink shared channel (PUSCH) 1102. In other words, HARQ responses may be transmitted in a fourth frame after reception of data associated with the HARQ response. In some embodiments, the uplink transmit chain may be shared between LTE and 5G NR communications. Thus, every fifth frame in LTE (on uplink and downlink to maintain synchronous HARQ) may be skipped to accommodate uplink transmissions on 5G NR. Thus, as shown, HARQ responses 806906 may be transmitted synchronously according to LTE scheduling. In other words, HARQ responses may be transmitted during the unused LTE frame time window. In addition, uplink data 1104 may be transmitted during any remaining time window unused for HARQ responses (e.g., since an LTE frame is equivalent to 1.5 5G NR frames for FDD). In addition, in order to maximize downlink throughput over the dual connectivity the 5G NR HARQ bundling may bundle HARQ responses for up to, for example, 10 downlink subframes. In addition, in some embodiments, synchronization (e.g., for timing and scheduling) between an LTE base station, e.g. such as eNB 602, and a 5G NR base station, e.g., such as gNB 604, may be via an X2 interface as described above. Further, the scheduling at eNB and gNB may also consider (or accommodate) uplink resources requested by a UE to adjust HARQ timing for 5G NR downlink traffic.

Figure 12:
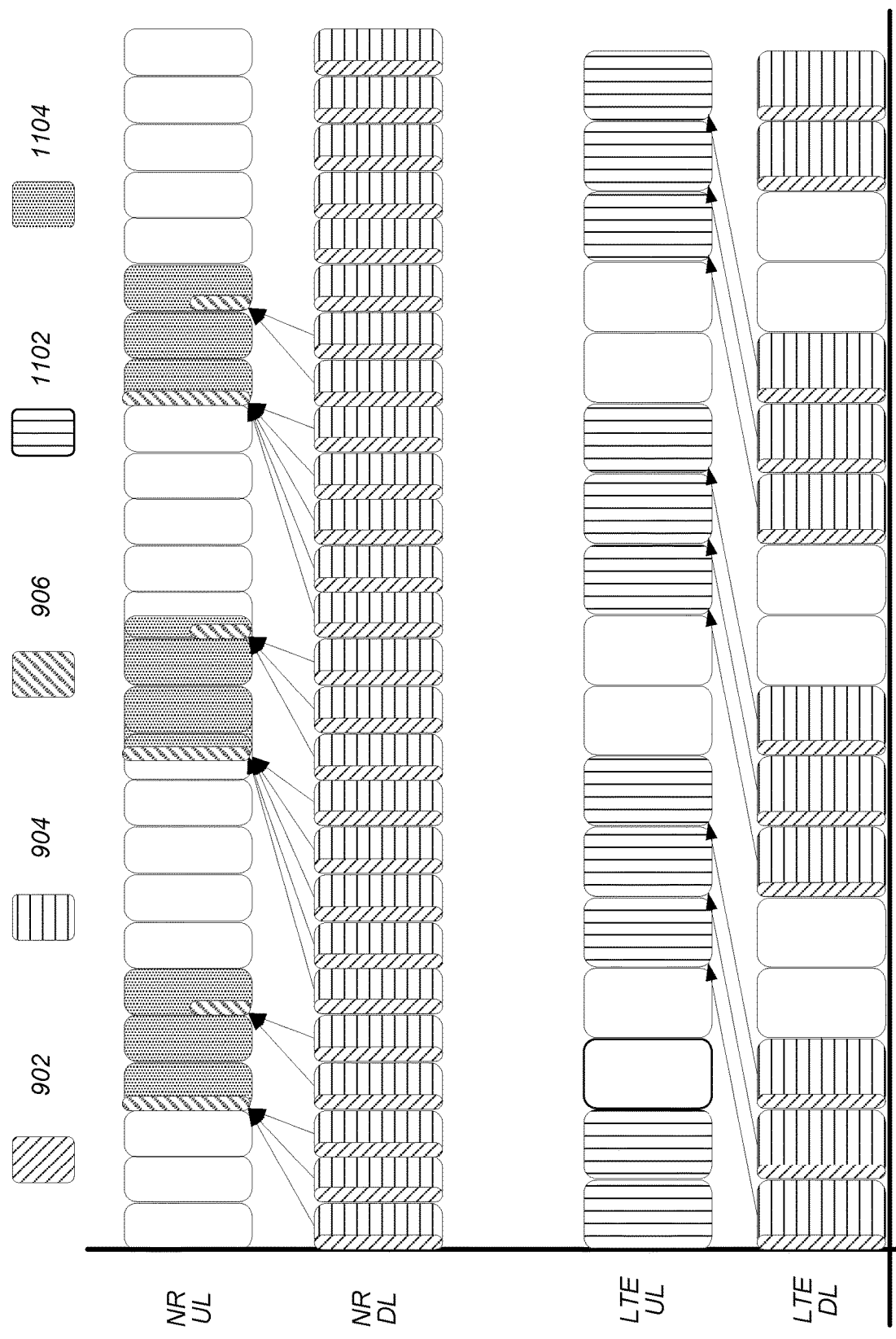
FIG. 12 illustrates another example of frame schedules for substantially concurrent communications according to 5G NR and LTE, according to some embodiments.

As another example, FIG. 12 illustrates another example of FDD frame schedules for substantially concurrent communications according to 5G NR and LTE, according to some embodiments. As shown in FIG. 12, in some embodiments, in order to provide more uplink resources for 5G NR connections, additional LTE subframes may be skipped. For example, a UE may be only scheduled on three consecutive subframes instead of four consecutive subframes as illustrated in FIG. 12. In other words, to increase uplink resources for the 5G NR connection, the downlink resources of the LTE connection are reduced. Note that although such a schedule may be out of current 3GPP specification for LTE, user capability and HARQ bundling capabilities are important to achieve an optimum balance for downlink using a shared uplink transmit chain.

Further Embodiments

In some embodiments, a network node (e.g., base station 604) may include (as described above) at least one antenna, a memory, and a processing element in communication with the memory and the at least one antenna.

In some embodiments, the processing element of the network node may be configured to receive, from a user equipment device (UE), such as UE 106, via the at least one antenna, a request to attach to the network node. The request to attach may include an indication that the UE may be capable of maintaining substantially concurrent connections with the network node and a second network node. The network node may operate according to a first radio access technology (RAT) (e.g., 5G NR) and the second network node (e.g., eNB 602) may operate according to a second RAT (e.g., LTE). The processing element may be further configured to synchronize timing with the second network node, receive, from the second network node, an indication of uplink and downlink grants scheduled by the second network node for the UE, allocate a dynamic uplink resource allocation for the UE, and transmit, to the UE via the at least one antenna, the dynamic uplink resource allocation. In some embodiments, the dynamic uplink resource allocation may accommodate the uplink grants scheduled by the second network node. For example, in some embodiments, the second network node may schedule the UE with a semi-static pattern of UL/DL transmissions and the semi-static pattern may be communicated to the first network node such that the first network node may accommodate the semi-static pattern for UL transmissions to the second network node. In some embodiments, the network node may also include a backhaul network interface and the indication of uplink and downlink grants may be received via the backhaul network interface. In some embodiments, to synchronize timing with the second network node, the processing element may be further configured to exchange, via the backhaul network interface, messages to synchronize timing between the network node and the second network node. In some embodiments, the processing element may be further configured to transmit, to the UE, an uplink hybrid automatic repeat request (HARQ) schedule. In some embodiments, the uplink HARQ schedule may accommodate the uplink grants received from the second network node.

In some embodiments, the processing element of the network node may be configured to receive, from a UE (e.g., UE 106) via the at least one antenna, an attachment request, determine a dynamic resource allocation for UE acknowledgment of data received from the network node, and transmit, to the UE via the at least one antenna, the dynamic resource allocation. In some embodiments, the dynamic resource allocation may include an indication of one or more downlink subframes to be acknowledged by the UE in a specified uplink subframe. In some embodiments, the dynamic resource allocation may include an indication that the UE bundles acknowledgement information for one or more downlink subframes in the specified uplink subframe. In some embodiments, the dynamic resource allocation may specify asynchronous HARQ. In some embodiments, the dynamic resource allocation may specify asynchronous bundled HARQ. In some embodiments, the dynamic resource allocation may be specified via a downlink control index (DCI). In some embodiments, the network node and the UE operate according to frequency division duplexing (FDD). In some embodiments, a frame may include twelve subframes and each frame may span 0.0096 seconds and each subframe may span 0.0008 seconds. In some embodiments, the network node and the UE may operate according to the 5G NR radio access technology.

In some embodiments, the processing element of the network node may be configured to receive, from a second network node, an indication of uplink and downlink grants scheduled for a UE (e.g., UE 106) by the second network node, schedule, based at least in part on the indication, one or more portions of uplink subframes for UE uplink transmissions, and transmit, to the UE via the at least one antenna, an allocation resource assignment indicating the schedule. In some embodiments, the UE may have a substantially concurrent attachment to the network node and the second network node. In some embodiments, the network node may operate according to a first RAT (e.g., 5G NR) and the second network node may operate according to a second RAT (e.g., LTE). In some embodiments, the allocation resource assignment may include an indication of one or more downlink subframes to be acknowledged by the UE in a specified uplink subframe. In some embodiments, the allocation resource assignment may include an indication that the UE bundles acknowledgement information for one or more downlink subframes in the specified uplink subframe. In some embodiments, the allocation resource assignment may specify asynchronous hybrid automatic repeat request (HARQ). In some embodiments, the allocation resource assignment may specify asynchronous bundled HARQ. In some embodiments, the allocation resource assignment may be specified via a downlink control index (DCI). In some embodiments, the one or more portions of uplink subframes may correspond to one or more uplink subframes not allocated to the UE by the second network node. In some embodiments, the network node, the second network node, and the UE may operate according to frequency division duplexing (FDD). In some embodiments, a frame, for the first RAT may include twelve subframes, each frame may span 0.0096 seconds and each subframe may span 0.0008 seconds. In some embodiments, a frame for the second RAT may include ten subframes, each frame may span 0.01 seconds and each subframe may span 0.001 seconds.

In some embodiments, a cellular communication circuit (e.g., included in a UE such as UE 106) may include a first modem, first radio frequency (RF) front end circuitry in communication with the first modem, first downlink front end circuitry in communication with the first RF front end circuitry, a second modem, second RF front end circuitry in communication with the second modem, second downlink front end circuitry in communication with the second RF front end circuitry, switch circuitry coupled to the first and second RF front end circuitry, and uplink front end circuitry coupled to the switch circuitry. The first modem may include at least one processor and a memory. Similarly, the second modem may include at least one processor and a memory. The first modem in conjunction with the first RF front end circuitry and first downlink front end circuitry may configured to operate according to a first radio access technology (RAT) (e.g., 5G NR) and the second modem in conjunction with the second RF front end circuitry and second downlink front end circuitry may be configured to operate according to a second RAT (e.g., LTE). In some embodiments, when the switch circuitry is in a first state, the uplink front end circuitry may be in communication with the first RF front end circuitry and when the switch circuitry is in a second state, the uplink front end circuitry may be in communication with the second RF front end circuitry. In some embodiments, the switch circuitry may be configured to switch to the first state upon notification that the first modem has data to transmit according to the first RAT and switch to the second state upon notification that the second modem has data to transmit according to the second RAT. In some embodiments, the cellular communication circuitry may be configured to substantially concurrently receive communications from a first network node operating according to the first RAT via first downlink front end circuitry and receive communications from a second network node operating according to the second RAT via the second downlink front end circuitry. In some embodiments, a first receive chain may include the first modem, first RF front end circuitry, and first downlink front end circuitry and a second receive chain may include the second modem, second RF front end circuitry, and second downlink front end circuitry. In some embodiments, the cellular communication circuitry may be configured to receive, via the first modem and first antenna, a dynamic resource allocation. The dynamic resource allocation may indicate one or more uplink subframes or one or more portions of uplink subframes to transmit acknowledgment information regarding one or more downlink subframes. In some embodiments, transmitting on the one or more uplink subframes or one or more portions of uplink subframes may not interfere with a transmission schedule of the second modem.

In some embodiments, a user equipment device (UE) (e.g., UE 106) may include at least one antenna, a memory, and at least one processor in communication with the memory and at least one antenna. In some embodiments, the at least one processor of the UE may be configured to transmit, to a network node (e.g., base station 102) via the at least one antenna, an attachment request and receive, from the network node via the at least one antenna, a dynamic resource allocation for UE acknowledgment of data received from the network node. In some embodiments, the dynamic resource allocation may include an indication of one or more downlink subframes to be acknowledged by the UE in a specified uplink subframe. In some embodiments, the dynamic resource allocation may include an indication that the UE bundles acknowledgement information for one or more downlink subframes in the specified uplink subframe. In some embodiments, the dynamic resource allocation may specify asynchronous hybrid automatic repeat request (HARQ). In some embodiments, the dynamic resource allocation may specify asynchronous bundled HARQ. In some embodiments, the dynamic resource allocation may be specified via a downlink control index (DCI). In some embodiments, the network node and the UE may operate according to frequency division duplexing (FDD). In some embodiments, a frame may comprise twelve subframes, each frame may span 0.0096 seconds, and each subframe may span 0.0008 seconds. In some embodiments, the network node and the UE may operate according to the 5G new radio (NR) radio access technology.

In some embodiments, a user equipment device (UE), such as UE 106, may include a first radio in communication with a first antenna, a second radio in communication with a second antenna, a switch coupled to the first and second radios, a third antenna coupled to the switch, and one or more processors coupled to the first and second radios. In some embodiments, the first radio may be configured to perform cellular communication according to a first radio access technology (RAT) (e.g., 5G NR) and the second radio may be configured to perform cellular communication according to a second RAT (e.g., LTE). In some embodiments, a first state of the switch may enable communication between the first radio and the third antenna and a second state of the switch may enable communication between the second radio and the third antenna. In some embodiments, the one or more processors may be configured to receive, from a first network node (such as base station 102), a dynamic resource allocation indicating one or more portions of uplink subframes for uplink transmissions to the first network node. The first network node may operate according to the first RAT. In some embodiments, the UE may substantially concurrently attached to the first network node via the first radio and a second network node via the second radio, wherein the second network node operates according to the second RAT. In some embodiments, the first network node may be configured to receive, from the second network node, an indication of uplink and downlink grants scheduled for the UE by the second network node. In some embodiments, the dynamic resource allocation may include an indication of one or more downlink subframes to be acknowledged by the UE in a specified uplink subframe. In some embodiments, the dynamic resource allocation may include an indication that the UE bundles acknowledgement information for one or more downlink subframes in the specified uplink subframe. In some embodiments, the dynamic resource allocation may specify asynchronous hybrid automatic repeat request (HARQ). In some embodiments, the dynamic resource allocation may specify asynchronous bundled HARQ. In some embodiments, the dynamic resource allocation may be specified via a downlink control index (DCI). In some embodiments, the one or more portions of uplink subframes correspond to one or more uplink subframes not allocated to the UE by the second network node. In some embodiments, the first and second network nodes and the UE may operate according to frequency division duplexing (FDD). In some embodiments, for the first RAT, a frame may comprise twelve subframes, each frame may span 0.0096 seconds, and each subframe may span 0.0008 seconds, and, for the second rat, a frame may comprise ten subframes, each frame may span 0.01 seconds, and each subframe may span 0.001 seconds.

In some embodiments, an apparatus may include a memory and at least one processor in communication with the memory. The at least one processor may be configured generate instructions to transmit, to a network node (e.g., base station 102), an attachment request and receive, from the network node, a dynamic resource allocation for apparatus acknowledgment of data received from the network node. In some embodiments, the dynamic resource allocation may include an indication of one or more downlink subframes to be acknowledged by the apparatus in a specified uplink subframe. In some embodiments, the dynamic resource allocation may include an indication that the apparatus bundles acknowledgement information for one or more downlink subframes in the specified uplink subframe. In some embodiments, the dynamic resource allocation may specify asynchronous hybrid automatic repeat request (HARQ). In some embodiments, the dynamic resource allocation may specify asynchronous bundled HARQ. In some embodiments, the dynamic resource allocation may be specified via a downlink control index (DCI). In some embodiments, the network node and the apparatus may operate according to frequency division duplexing (FDD). In some embodiments, a frame may comprise twelve subframes, each frame may span 0.0096 seconds, and each subframe may span 0.0008 seconds. In some embodiments, the network node and the apparatus may operate according to the 5G new radio (NR) radio access technology.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
a first radio in communication with a first antenna, wherein the first radio is configured to perform cellular communication according to a first radio access technology (RAT);
a second radio in communication with a second antenna, wherein the second radio is configured to perform cellular communication according to a second RAT;
a switch coupled to the first and second radios;
a third antenna coupled to the switch, wherein a first state of the switch enables communication between the first radio and the third antenna, wherein a second state of the switch enables communication between the second radio and the third antenna; and
one or more processors coupled to the first and second radios, wherein the one or more processors and the first and second radios are configured to perform voice and/or data communications;
wherein the one or more processors are configured to cause the UE to:
couple the third antenna to the first radio via the switch;
transmit, via the first radio while the switch is in the first state, a request to attach to a first network node operating according to the first RAT;
transmit, via the first radio while the switch is in the first state, signaling indicating that the UE is capable of maintaining concurrent downlink (DL) connections with the first network node and a second network node, and wherein the second network node operates according to the second RAT, wherein the DL connections are maintained via the first radio and the second radio;
couple the third antenna to the second radio via the switch;
transmit, via the second radio while the switch is in the second state, signaling to attach to the second network node;
receive, via the first receive chain, uplink and downlink grants from the first network node in a dual connectivity configuration with the first and second network nodes; and
receive, via the second receive chain, uplink and downlink grants from the second network node in the dual connectivity configuration with the first and second network nodes, wherein a portion of downlink subframes are not available for downlink transmissions from the first network node to accommodate potential uplink transmissions to the second network node.

2. The UE of claim 1,
wherein the one or more processors are further configured to cause the UE to:
receive, via the first radio, uplink and downlink grants from the first network node.

3. The UE of any of claim 1,
wherein the one or more processors are further configured to cause the UE to:
receive, via the second radio, a dynamic uplink resource allocation from the second network node.

4. The UE of claim 3,
wherein the dynamic uplink resource allocation accommodates uplink grants received from the first network node.

5. The UE of claim 1,
wherein the one or more processors are further configured to cause the UE to:
receive, via the second radio, an uplink hybrid automatic repeat request (HARQ) schedule from the second network node.

6. The UE of claim 5,
wherein the uplink HARQ schedule accommodates the uplink grants received from the first network node.

7. The UE of claim 1,
wherein the one or more processors are further configured to cause the UE to:
receive, via the first radio, downlink transmissions from the first network node while concurrently receiving, via the second radio, downlink transmissions from the second network node.

8. The UE of claim 1,
wherein the one or more processors are further configured to cause the UE to:
switch the state of the switch from the first state to the second state; and
transmit, via the second radio, hybrid automatic repeat request (HARQ) acknowledgements/negative acknowledgements associated with data received from the second network node.

9. The UE of claim 1,
wherein the one or more processors are further configured to cause the UE to:
receive, via the first radio, uplink and downlink grants from the first network node, wherein the uplink and downlink grants comprise a semi-static pattern of uplink and downlink transmissions; and
receive, via the second radio, a dynamic uplink resource allocation from the second network node, wherein the dynamic uplink resource allocation accommodates the semi-static pattern of uplink grants received from the first network node.

10. The UE of claim 1,
wherein the first RAT is LTE; and
wherein the second RAT is 5G NR.

11. An apparatus, comprising:
a memory; and
at least one processor in communication with the memory, wherein the at least one processor is configured to:
generate instructions to transmit, via a transmit chain in communication with the at least one processor, a request to attach to a first network node operating according to Long Term Evolution (LTE) radio access technology (RAT);
generate instructions to transmit to the first network node via the transmit chain, signaling indicating that concurrent downlink (DL) connections with the first network node and a second network node can be maintained, wherein the second network node operates according to 5G new radio (5G NR) RAT, and wherein the DL connections are maintained via a first receive chain in communication with the at least one processor and a second receive chain in communication with the at least one processor;
generate instructions to transmit to the second network node via the transmit chain, signaling to attach to the second network node;
receive, via the first receive chain, uplink and downlink grants from the first network node in a dual connectivity configuration with the first and second network nodes; and
receive, via the second receive chain, uplink and downlink grants from the second network node in the dual connectivity configuration with the first and second network nodes, wherein a portion of downlink subframes are not available for downlink transmissions from the first network node to accommodate potential uplink transmissions to the second network node.

12. The apparatus of claim 11,
wherein the at least one processor is further configured to:
receive, via the first receive chain, uplink and downlink grants from the first network node.

13. The apparatus of claim 11,
wherein the at least one processor is further configured to:
receive, via the second receive chain, a dynamic uplink resource allocation from the second network node, wherein the dynamic uplink resource allocation accommodates uplink grants received from the first network node.

14. The apparatus of claim 11,
wherein the at least one processor is further configured to:
receive, via the second receive chain, an uplink hybrid automatic repeat request (HARQ) schedule from the second network node.

15. The apparatus of claim 14,
wherein the uplink HARQ schedule accommodates the uplink grants received from the first network node.

16. A non-transitory computer readable memory medium storing program instructions executable by processing circuitry to cause a user equipment device (UE) to:
generate instructions to transmit, via a transmit chain of the UE, a request to attach to a first network node operating according to a first radio access technology (RAT);
generate instructions to transmit to the first network node via the transmit chain, signaling indicating that the UE is capable of maintaining concurrent downlink (DL) connections with the first network node and a second network node, wherein the second network node operates according to a second RAT, and wherein the DL connections are maintained via a first receive chain of the UE and a second receive chain of the UE;
generate instructions to transmit to the second network node via the transmit chain, signaling to attach to the second network node;
receive, via the first receive chain, uplink and downlink grants from the first network node in a dual connectivity configuration with the first and second network nodes; and
receive, via the second receive chain, uplink and downlink grants from the second network node in the dual connectivity configuration with the first and second network nodes, wherein a portion of downlink subframes are not available for downlink transmissions from the first network node to accommodate potential uplink transmissions to the second network node.

17. The non-transitory computer readable memory medium of claim 16,
  wherein the program instructions are further executable by processing circuitry to cause the UE to:
    receive, via the second receive chain, a dynamic uplink resource allocation from the second network node, wherein the dynamic uplink resource allocation accommodates uplink grants received from the first network node.

18. The non-transitory computer readable memory medium of claim 16,
  wherein the program instructions are further executable by processing circuitry to cause the UE to:
    receive, via the second receive chain, an uplink hybrid automatic repeat request (HARQ) schedule from the second network node, wherein the uplink HARQ schedule accommodates the uplink grants received from the first network node.

19. The non-transitory computer readable memory medium of claim 16,
  wherein the program instructions are further executable by processing circuitry to cause the UE to:
    receive, via the first receive chain, downlink transmissions from the first network node while concurrently receiving, via the second receive chain, downlink transmissions from the second network node.

20. The non-transitory computer readable memory medium of claim 16,
  wherein the first RAT is LTE; and
  wherein the second RAT is 5G NR.

* * * * *